| (12) | United States Patent | (10) Patent No.: | US 9,255,640 B1 |
|---|---|---|---|
| | Sten et al. | (45) Date of Patent: | Feb. 9, 2016 |

(54) PARK LOCK MECHANISM

(71) Applicant: e-AAM Driveline Systems AB, Trollhättan (SE)

(72) Inventors: Erik J. Sten, Trollhättan (SE); Tomas Bäfver, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days.

(21) Appl. No.: 14/475,660

(22) Filed: Sep. 3, 2014

(51) Int. Cl.
*F16H 63/34* (2006.01)
*B60T 1/06* (2006.01)

(52) U.S. Cl.
CPC ............ *F16H 63/3458* (2013.01); *B60T 1/062* (2013.01); *F16H 63/3416* (2013.01); *F16H 63/3433* (2013.01); *F16H 63/3466* (2013.01); *F16H 63/3475* (2013.01); *F16H 63/3491* (2013.01)

(58) Field of Classification Search
None
See application file for complete search history.

(56) References Cited

U.S. PATENT DOCUMENTS

| 2,875,856 | A | * | 3/1959 | Mrlik .................... B60T 1/005 188/69 |
| 5,429,212 | A | | 7/1995 | Schlosser |
| 5,807,205 | A | | 9/1998 | Odaka et al. |
| 6,074,321 | A | | 6/2000 | Maeda et al. |
| 6,692,394 | B2 | | 2/2004 | Takenaka |
| 7,448,978 | B2 | | 11/2008 | Habel |
| 8,950,563 | B2 | * | 2/2015 | Kayukawa ................ B60T 1/06 188/31 |
| 2005/0098400 | A1 | * | 5/2005 | Kleinert .............. F16H 63/3475 188/300 |
| 2005/0159861 | A1 | | 7/2005 | Iwatsuki et al. |
| 2011/0094806 | A1 | | 4/2011 | Mack et al. |
| 2012/0058855 | A1 | | 3/2012 | Sten |
| 2013/0228412 | A1 | * | 9/2013 | Scherer ................... B60T 1/005 192/219.4 |
| 2015/0159752 | A1 | * | 6/2015 | Popp ....................... F16H 63/34 192/219.4 |
| 2015/0167843 | A1 | * | 6/2015 | Schuller ............. F16H 63/3483 192/219.4 |

* cited by examiner

*Primary Examiner* — Rodney H Bonck
(74) *Attorney, Agent, or Firm* — Harness, Dickey & Pierce, P.L.C.

(57) ABSTRACT

A park lock having an actuator assembly for pivoting a pawl relative to a dog ring. The actuator assembly has a first linear actuator, a locking mechanism, a first biasing spring and a second linear actuator. The first linear actuator has a first output member that is movable along a movement axis that is parallel to a pivot axis of the pawl. The locking mechanism is configured to selectively couple the first output member and a cam for common movement along the movement axis. The first biasing spring is configured to move the cam along the movement axis relative to the first output member when the locking mechanism decouples the cam from the first output member. The second linear actuator is configured to move the cam along the movement axis and against the first biasing spring when the cam is decoupled from the first output member.

21 Claims, 3 Drawing Sheets

– 1 –
PARK LOCK MECHANISM

FIELD

The present disclosure relates to a park lock mechanism.

BACKGROUND

This section provides background information related to the present disclosure which is not necessarily prior art.

Park lock mechanisms are commonly integrated into transmissions and vehicle driveline components and help to immobilize a vehicle when the vehicle is parked and not in use. Known park lock mechanism typically include a dog ring, which is coupled to a rotatable component of the driveline component for common rotation, and a pawl that is selectively engagable with the dog ring. While the known park lock mechanisms are suitable for their intended purpose, they nevertheless remain susceptible to improvement.

SUMMARY

This section provides a general summary of the disclosure, and is not a comprehensive disclosure of its full scope or all of its features.

In one form, the present teachings provide a park lock mechanism for a vehicle driveline component that has a rotatable member. The park lock mechanism includes a housing, a dog ring, a pawl, a pawl spring and an actuator assembly. The dog ring is configured to be coupled to the rotatable member for common rotation. The dog ring is received in the housing and has a plurality of circumferentially spaced apart teeth. The pawl has a pawl tooth and is pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing. The pawl spring biases the pawl toward the second pivot position. The actuator assembly has a cam follower, a cam, a first actuator device, a second actuator device, and a cam coupling. The cam follower is coupled to the pawl for movement therewith about the pivot axis. The cam is movable along a movement axis that is parallel to the pivot axis. The cam contacts the follower and includes a first cam portion and a second cam portion. Positioning of the first cam portion on the cam follower positions the pawl in the first pivot position, and positioning of the second cam portion on the cam follower positions the pawl in the second pivot position. The first actuator device includes a first linear motor with a first output member that is movable along the movement axis between a first output member position and a second output member position. The first output member is coaxial with the cam. The second actuator device includes a second linear motor with a second output member. The second output member is movable along the movement axis between a third output member position and a fourth output member position. The second output member is coaxial with the first output member. The cam coupling includes a first biasing spring and a locking mechanism. The first biasing spring is configured to bias the cam in a first direction along the movement axis relative to the first output member. The locking mechanism is configured to selectively lock the cam to the first output member for axial movement therewith. The locking mechanism is configured to unlock the cam from the first output member in response to movement of the second output member from the third output member position to the fourth output member position when the first output member is in the first output member position. The locking mechanism is configured to lock the cam to the first output member in response to movement of the second output member from the fourth output member position to the third output member position when the first output member is in the first output member position.

In another form, the present teachings provide a park lock mechanism for a vehicle driveline component that has a rotatable member. The park lock mechanism includes a housing, a dog ring, a pawl, a pawl spring and an actuator assembly. The dog ring is configured to be coupled to the rotatable member for common rotation. The dog ring is received in the housing and has a plurality of circumferentially spaced apart teeth. The pawl has a pawl tooth and is pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing. The pawl spring biases the pawl toward the second pivot position. The actuator assembly has a first linear actuator, a locking mechanism, a first biasing spring and a second linear actuator. The first linear actuator has a first output member that is movable along a movement axis that is parallel to the pivot axis. The locking mechanism is configured to selectively couple the first output member and the cam for common movement along the movement axis. The first biasing spring is configured to move the cam along the movement axis relative to the first output member when the locking mechanism decouples the cam from the first output member. The second linear actuator is configured to operate the locking mechanism to decouple the cam from the first output member to permit the first biasing spring to move the cam along the movement axis.

In still another form, the present teachings provide a method for operating a park lock mechanism having a dog ring, a pawl, a cam follower and a cam. The dog ring is rotatable about a drive axis and has a plurality of circumferentially spaced apart teeth. The pawl has a pawl tooth that is pivotable about a pivot axis between a first pivot position, in which the pawl tooth is disengaged from the teeth of the dog ring, and a second pivot position in which the pawl tooth engages the teeth of the dog ring. The cam follower is mounted to the pawl for common movement about the pivot axis. The cam is movable along a movement axis and has first and second cam portions. Positioning of the first cam portion on the cam follower positions the pawl in the first pivot position. Positioning of the second cam portion on the cam follower positions the pawl in the second pivot position. The method includes: providing a first actuator and a second actuator, the first actuator having a first output member, the second actuator having a second output member that is coaxial with the first output member; locking the cam to a first output member; operating the first actuator to move the cam along the movement axis and cause pivoting motion of the pawl between the first and second pivot positions; operating the second actuator to decouple the cam from the first output member; and moving the cam along the movement axis to cause pivoting motion of the pawl from the first position to the second pivot position in response to decoupling the cam from the first output member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
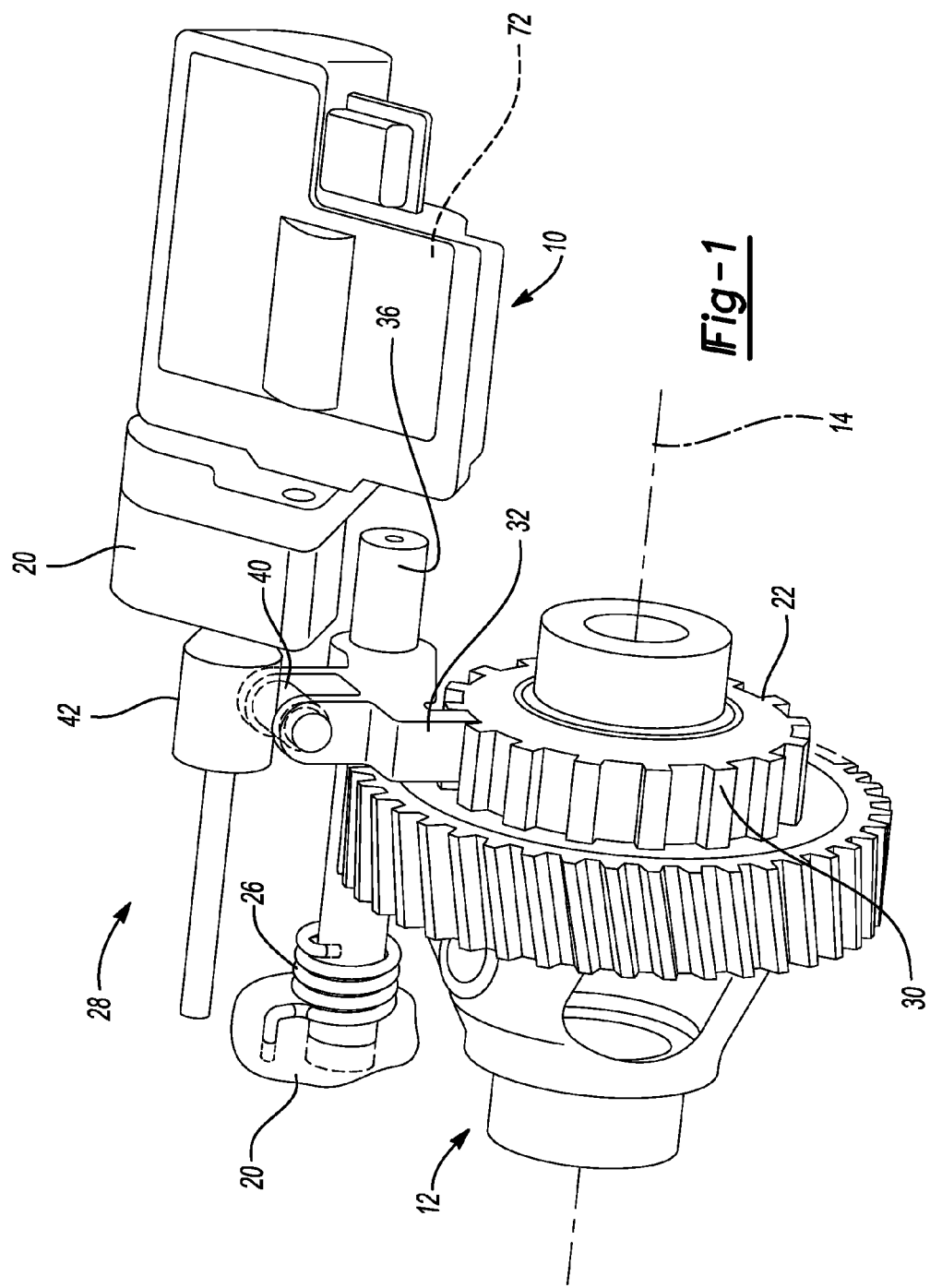
FIG. 1 is a perspective view of a portion of a driveline component having a park lock mechanism constructed in accordance with the teachings of the present disclosure.
Figure 2:
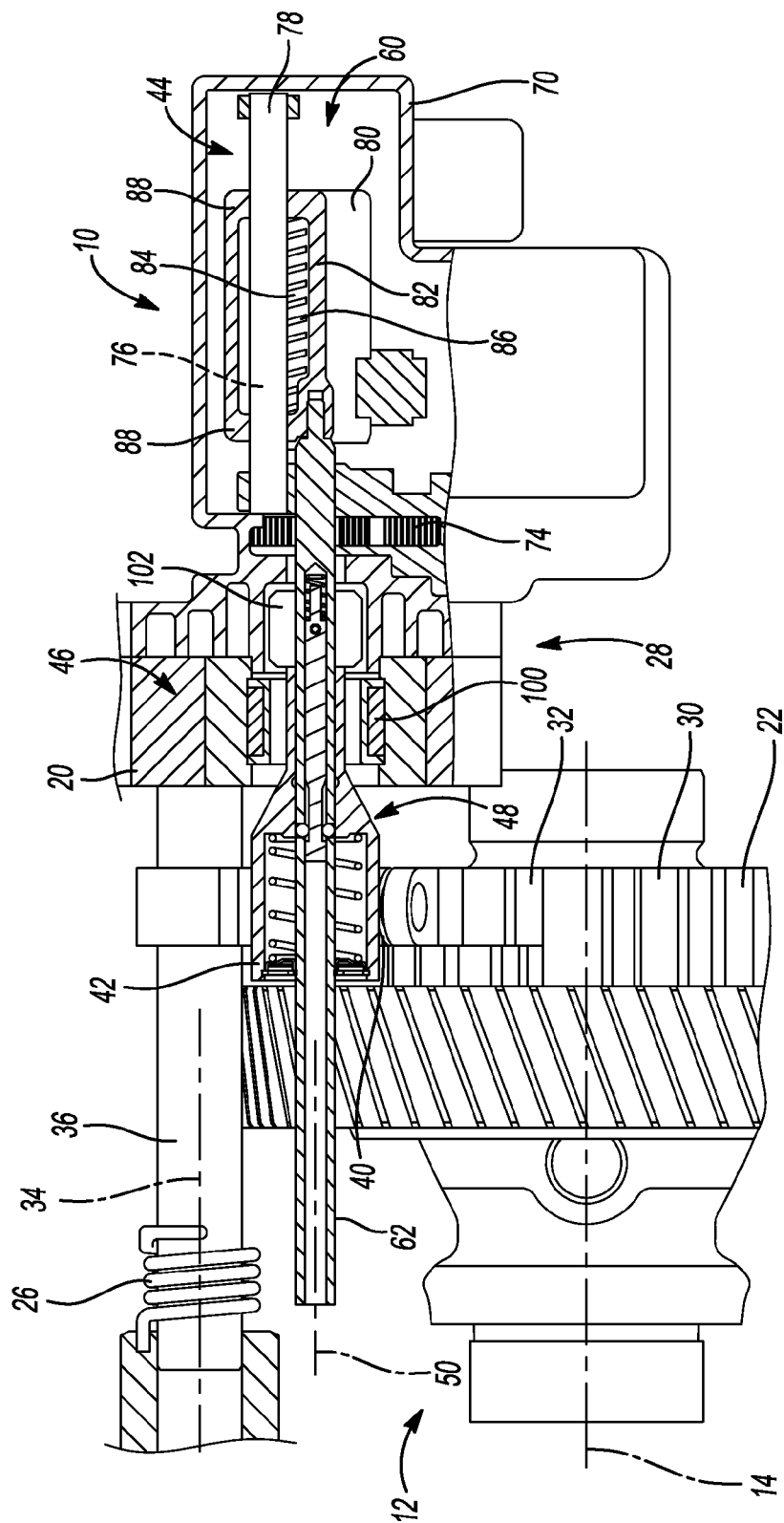
FIG. 2 is a section view of the portion of the driveline component taken through a portion of the park lock mechanism along a movement axis.

With reference to FIGS. 1 and 2 of the drawings, a park lock mechanism 10 constructed in accordance with the teachings of the present disclosure is shown in operative association with an exemplary vehicle driveline component 12. In the particular example provided, the driveline component 12 is a differential case that is rotatable about a driven axis 14, but those of skill in the art will appreciate that other rotatable elements of a driveline component could be employed in the alternative.

The park lock mechanism 10 can comprise a housing 20, a dog ring 22, a pawl 24, a pawl spring 26, and an actuator assembly 28. The housing 20, the dog ring 22, the pawl 24 and the pawl spring 26 can be configured in a conventional and well known manner and as such, these components need not be described in significant detail herein. Briefly, the housing 20 can be configured to house a portion of the park lock mechanism 10 and can optionally be configured to house the vehicle driveline component 12. In the example provide, the housing 20 houses portions of the park lock mechanism 10 as well as components associated with a drive module of the type that is disclosed in commonly assigned U.S. Pat. No. 8,663,051 entitled "Axle Assembly With Torque Distribution Drive Mechanism", the disclosure of which is incorporated by reference as if fully set forth in detail herein. The dog ring 22 can be an annular structure that can define a plurality of circumferentially spaced apart teeth 30. The dog ring 22 can be mounted to the driveline component 12 for common rotation about the driven axis 14. The pawl 24 can have a pawl tooth 32 and can be mounted to the housing 20 for pivoting motion about a pivot axis 34 between a first pivot position, in which the pawl tooth 32 is disengaged from the teeth 30 of the dog ring 22 so as to not impede rotation of the dog ring 22 relative to the housing 20, and a second pivot position in which the pawl tooth 32 engages the teeth 30 of the dog ring 22 so as to impede rotation of the dog ring 22 relative to the housing 20. The pivot axis 34 can be parallel to the driven axis 14. In the example provided, the pawl 24 is fixedly mounted on a cylindrically-shaped rail 36 that is rotatably coupled to the housing 20. The pawl spring 26 is configured to bias the pawl 24 toward the first pivot position. In the example provided, the pawl spring 26 is a torsion spring that is mounted to the rail 36 and engaged to the housing 20.

The actuator assembly 28 can have a cam follower 40, a cam 42, a first actuator device 44, a second actuator device 46 and a cam coupling 48. The cam follower 40 can be coupled to the pawl 24 for movement therewith about the pivot axis 34. In the example provided, the cam follower 40 is a roller that is rotatably mounted to the pawl 24.

Figure 3:
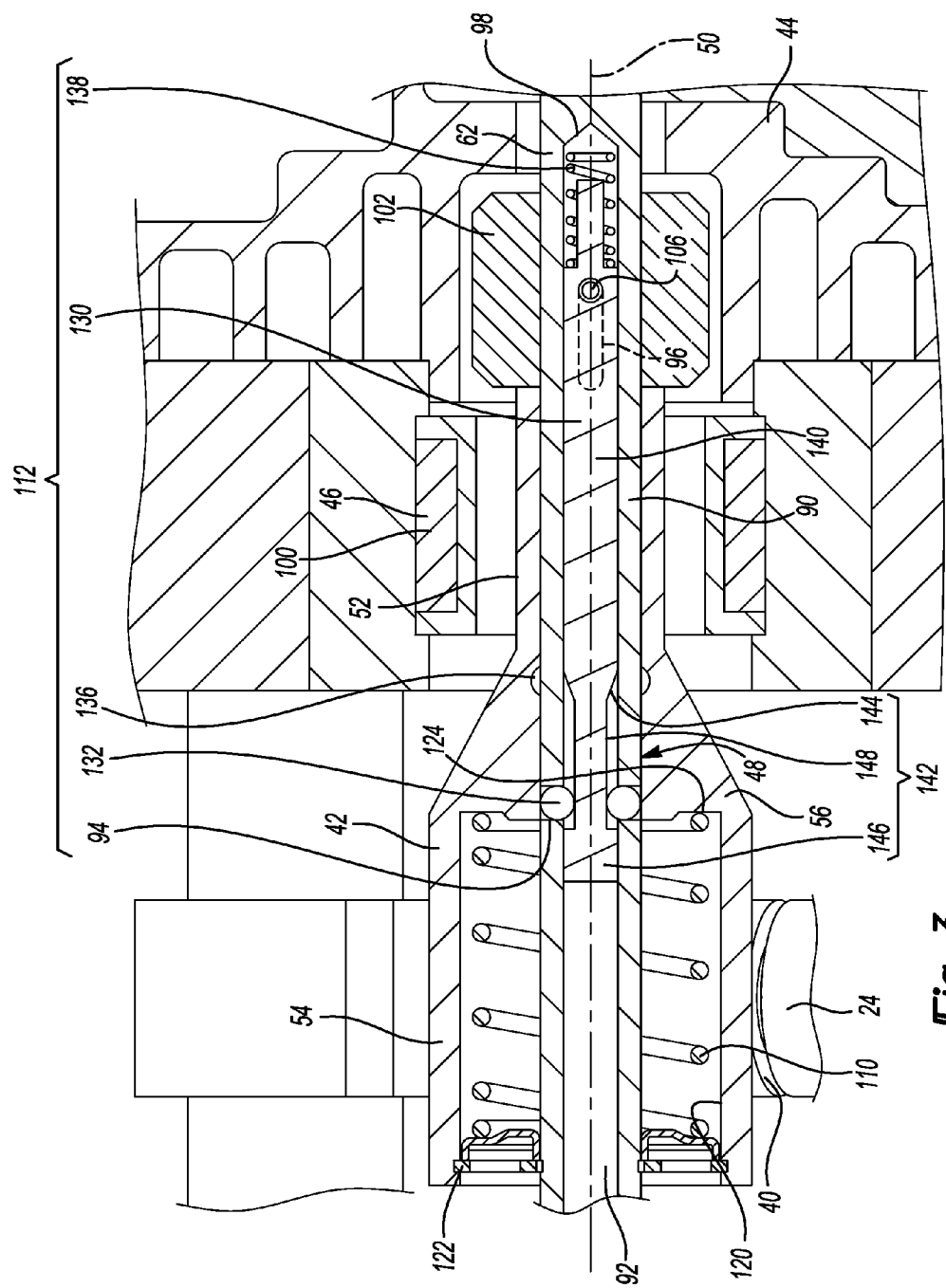
FIG. 3 is an enlarged portion of FIG. 2.

With reference to FIGS. 2 and 3, the cam 42 can be movable along a movement axis 50 that can be parallel to the pivot axis 34. The cam 42 is configured to contact the cam follower 40 and includes a first cam portion 52, a second cam portion 54 and a transition portion 56 between the first and second cam portions 52 and 54. The first cam portion 52 can be cylindrically shaped and sized to cause the pawl 24 to be positioned in the first pivot position when the first cam portion 52 is positioned in contact with the cam follower 40. The second cam portion 54 can be cylindrically shaped and sized to cause the pawl 24 to be positioned in the second pivot position when the second cam portion 54 is positioned in contact with the cam follower 40.

With specific reference to FIG. 2, the first actuator device 44 can be any type of linear actuator and can comprise a first linear motor 60 having a first output member 62 that is movable along the movement axis 50 between a first output member position and a second output member position. The first linear motor 60 can be configured in any desired manner, but in the particular example provided, the first linear motor 60 comprises a first actuator housing 70, a rotary motor 72 (FIG. 1), a transmission 74, a lead screw 76, a cradle rail 78, a cradle assembly 80 and the first output member 62. The first actuator housing 70 is configured to be fixedly coupled to the housing 20 and can house desired portions of the first linear motor 60. The rotary motor 72 is fixedly coupled to the first actuator housing 70. The transmission 74 can be mounted to the first actuator housing 70 and can receive rotary power from the rotary motor 72. The lead screw 76 can be rotatably mounted to the first actuator housing 70 and can receive rotary power that is output from the transmission 74. The lead screw 76 can be oriented generally parallel to the movement axis 50. The cradle rail 78 can be mounted to the first actuator housing 70 and can be generally parallel to the lead screw 76. The cradle assembly 80 can comprise a cradle 82, a cradle body 84, and a cradle spring 86. The cradle 82 can be slidably mounted on the cradle rail 78 and can include a pair of arms 88 between which the cradle body 84 and the cradle spring 86 can be received. The cradle body 84 can be threadably coupled to the lead screw 76 and can be moveable between the arms 88 of the cradle 82. The cradle spring 86 can be mounted on the cradle body 84 and is configured to contact the arms 88 to thereby center the cradle body 84 between the arms 88. The cradle assembly 80 is configured to permit movement of the cradle body 84 relative to the cradle 82 when needed through compression of the cradle spring 86. The first output member 62 can be fixedly coupled to the cradle 82 for movement therewith.

With reference to FIG. 3, the first output member 62 can comprise a cylindrical rod-shaped body portion 90 with a hollow, longitudinally extending cavity 92, a pair of detent holes 94 that are formed through the body portion 90 and intersect the cavity 92, a slotted aperture 96 that is formed through the body portion 90 and intersects the cavity 92, and an interior end wall 98 that forms a closed end of the cavity 92. The first output member 62 can be coaxial with the cam 42 and in the particular example provided, the cam 42 is slidably and concentrically mounted on the first output member 62.

The second actuator device 46 can be any type of linear actuator, such as a solenoid having an electromagnetic coil 100 and a second output member 102 that can be moved relative to the electromagnetic coil between a third output member position and a fourth output member position. The electromagnetic coil 100 and the second output member 102 can be coaxial with the first output member 62. For example, the second output member 102 can be an annular structure that is coupled to the first output member 62 in such a way that the second output member 102 can slide on the first output member 62 between two predetermined points. In the example provided, a pin 106 is employed to limit movement of the second output member 102 relative to the first output member 62. The pin 106 can be fixedly coupled to and extend through the second output member 102 such that movement of the second output member 102 along the movement axis 50 causes corresponding movement of the pin 106. The pin 106 can be received in the slotted aperture 96 formed in the first output member 62. Those of skill in the art will appreciate that the second output member 102 can be moved along the movement axis 50 such that the pin 106 is disposed between the opposite ends of the slotted aperture 96 so that movement of the second output member 102 is not effected by the first output member 62 and/or so movement of the second output member 102 does not effect movement of the first output member 62.

The cam coupling 48 can include a first biasing spring 110 and a locking mechanism 112. The first biasing spring 110 can be configured to bias the cam 42 in a first direction along the movement axis 50 relative to the first output member 62, such as toward the second output member 102. In the example provided, the first biasing spring 110 is a helical coil spring that is received in a bore 120 in the cam 42 and mounted coaxially about the first output member 62 between a keeper 122, which is received in the bore 120 and fixedly mounted to both the first output member 62 and the cam 42, and a shoulder 124 in the cam 42 that is defined by the bore 120.

The locking mechanism 112 is configured to selectively lock the cam 42 to the first output member 62 for common axial movement along the movement axis 50. The locking mechanism 112 can be configured to unlock the cam 42 from the first output member 62 in response to movement of the second output member 102 in a predetermined manner. In the particular example provided, the locking mechanism 112 is configured to unlock the cam 42 from the first output member 62 in response to movement of the second output member 102 from the third output member position to the fourth output member position when the first output member 62 is in the first output member position.

The locking mechanism 112 can also be configured to coordinate the locking of the cam 42 to the first output member 62 in response to movement of the second output member 102 in a predetermined manner. In the particular example provided, the locking mechanism 112 is configured to coordinate the locking of the cam 42 to the first output member 62 in response to movement of the second output member 102 from the fourth output member position to the third output member position when the first output member 62 is in the first output member position.

The locking mechanism 112 can be configured in any desired manner, but in the particular example provided, the locking mechanism 112 is configured in the form of a detent mechanism having a plunger 130, one or more balls 132, one or more detent holes 94 (e.g., in the first output member 62), one or more recesses 136 (e.g., in the cam 42) and a second biasing spring 138. The detent holes 94 can be formed through the first output member 62 and can be disposed generally perpendicular to a longitudinal axis of the first output member 62 (which can be parallel to the movement axis 50), for example. Each of the detent holes 94 is sized to receive a corresponding one of the balls 132 there through. The recesses 136 can be sized and shaped to receive a portion of a corresponding one of the balls 132 therein.

The plunger 130 can be fixedly coupled to the second output member 102 for axial movement therewith, such as via the pin 106 that extends through the first and second output members 62 and 102. The plunger 130 can have a body 140 and an engagement profile 142 that can contact the balls 132. The engagement profile 142 can comprise a ramped portion 144, a stop member 146 and a necked-down portion 148 that can be disposed axially between the ramped portion 144 and the stop member 146. The ramped portion 144 can be configured to drive the balls 132 through the first output member 62 and into engagement with the recesses 136 in the cam 42. The necked-down portion 148 can provide sufficient space in a radial direction that permits the balls 132 to move out of the recesses 136 so that the cam 42 can move along the movement axis 50 relative to the first output member 62. The ramped portion 144 can extend directly from the body 140 and can be contoured in any desired manner such that an outer surface of the engagement profile 142 reduces in diameter with decreasing distance to the necked-down portion 148. For example, the ramped portion 144 could be defined by a radius, or could be shaped in a frusto-conical manner as is depicted in the particular example provided. The necked-down portion 148 can be shaped as a cylindrical segment. The stop member 146 can be configured to engage the balls 132 to limit movement of the plunger 130 relative to the first output member 62 in the first direction along the movement axis 50. The second biasing spring 138 can be coaxial with the first output member 62 and can be disposed in the cavity 92 between the first output member 62 and the second output member 102 so as to bias the second output member 102 in the second direction along the movement axis 50 relative to the first output member 62. It will be appreciated that the second biasing spring 138 can bias the plunger 130, the pin 106 and the second output member 102 in the second direction relative to the first output member 62. In the example provided, the second biasing spring 138 is not configured to counteract the first biasing spring 110 and as such, the second biasing spring 138 will not cause movement of the plunger 130, the pin 106 and the second output member 102 in the second direction relative to the first output member 62.

During standard operation of the park lock mechanism 10 (FIG. 2), the locking mechanism 112 is in a locked condition that locks the first output member 62 to the cam 42 for common movement along the movement axis 50. In the locked condition, the ramped portion 144 of the plunger 130 urges the balls 132 in a radially outwardly direction through the detent holes 94 in the first output member 62 and into the recesses 136 in the cam 42 to thereby lock the cam 42 to the first output member 62. The first actuator device 44 is operated to cause corresponding motion of the first output member 62 in the first and second directions along the movement axis 50 between the first and second output member positions, which causes corresponding pivoting movement of the pawl 24 between the first and second pivot positions.

In the event that the first output member 62 is not able to move from the first output member position to the second output member position, the second actuator device 44 can be operated to move the second output member 102 from the third output member position to the fourth output member position to cause motion of the plunger 130 in the second direction along the movement axis 50 to cause the locking mechanism 112 to operate in an unlocked condition. In this regard, the plunger 130 can move with the second output member 102 so that the necked-down portion 148 of the plunger 130 is disposed in-line with the balls 132 so that the force exerted on the cam 42 by the first biasing spring 110 can urge the balls 132 to move in a radially inward direction and disengage the recesses 136 to permit the cam 42 to be moved in the first direction along the movement axis 50. The cam 42 can be re-coupled to the first output member 62 through operation of the first actuator device 44. In this regard, the first actuator device 44 can be operated to cause movement of the first output member 62 in the first direction. Since the pin 106 is received in the slotted aperture 96 in the first output member 62, movement of the first output member 62 in the first direction does not cause corresponding motion of the plunger 130, the pin 106, the second output member 102 or the cam 42. Moreover, the second biasing spring 138 can urge the plunger 130 away from the first output member 62 during movement of the first output member 62 in the first direction so that the first output member 62, as well as the balls 132 that are captured in the detent holes 94 in the first output member 62, are moved in the first direction relative to the plunger 130 and the cam 42. It will be appreciated that the balls 132 are moved along the engagement profile 142 on the plunger 130 and onto the ramped portion 144 so that the balls 132 are urged radially outwardly by the plunger and into the recesses 136 in the cam 42 to thereby operate the locking mechanism 112 in the locked condition, which locks the cam 42 to the first output member 62. Thereafter, the first actuator device 44 can be operated to drive the first output member 62 in the second direction into the first output member position to cause corresponding pivoting movement of the pawl 24 into the first pivot position.

Alternatively, the second actuator device 44 could be of a type that can be operated to cause movement of the second output member 102 relative to the first output member 62 in the second direction along the movement axis toward the third output member position. Movement of the second output member 102 in this manner can move the pin 106 in the slotted aperture 96 in the first output member 62, as well as move the plunger 130 and the cam 42 in a corresponding manner. Since the balls 132 are held in the detent holes 94 in the first output member 62 and ride on the engagement profile 142 of the plunger 130, coordinated movement of the plunger 130 and the cam 42 in the second direction relative to the first output member 62 permits the balls 132 to be forced radially outwardly and into the recesses 136 so that the locking mechanism 112 is operated in the locked condition to fix the cam 42 to the first output member 62. Since the first output member 62 is in the first output member position, the cam 42 is locked to the first output member 62 at a location that corresponds with the positioning of the pawl 24 in the first pivot position.

In view of the above discussion, those of skill in the art will appreciate that the present disclosure provides a method for operating a park lock mechanism. The method includes: providing a first actuator and a second actuator, the first actuator having a first output member, the second actuator having a second output member that is coaxial with the first output member; locking the cam to a first output member; operating the first actuator to move the cam along the movement axis and cause pivoting motion of the pawl between the first and second pivot positions; decoupling the cam from the first output member; and operating the second actuator to move the cam along the movement axis and cause pivoting motion of the pawl between the first and second pivot positions. Optionally, movement of the cam to cause pivoting motion of the pawl into the first pivot position when the second actuator is operated can cause the cam to be recoupled to first output member. Also optionally, decoupling the cam from the first output member causes the cam to be moved along the movement axis such that the pawl pivots into the second pivot position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

park lock mechanism 10
driveline component 12
driven axis 14
housing 20
dog ring 22
pawl 24
pawl spring 26
actuator assembly 28
teeth 30
pawl tooth 32
pivot axis 34
rail 36
cam follower 40
cam 42
first actuator device 44
second actuator device 46
cam coupling 48
movement axis 50
first cam portion 52
second cam portion 54
transition portion 56
first linear motor 60
first output member 62
first actuator housing 70
rotary motor 72
transmission 74
lead screw 76
cradle rail 78
cradle assembly 80
cradle 82
cradle body 84
cradle spring 86
arms 88
body portion 90
cavity 92
detent holes 94
slotted aperture 96
interior end wall 98
electromagnetic coil 100
second output member 102
pin 106
first biasing spring 110
locking mechanism 112
bore 120
keeper 122
shoulder 124
plunger 130
ball 132
recess 136
second biasing spring 138
body 140
engagement profile 142
ramped portion 144
stop member 146
necked-down portion 148

What is claimed is:

1. A park lock mechanism for a vehicle driveline component having a rotatable member, the park lock mechanism comprising:
a housing;
a dog ring that is adapted to be coupled to the rotatable member for common rotation, the dog ring being received in the housing and comprising a plurality of circumferentially spaced apart teeth;
a pawl having a pawl tooth, the pawl being pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing;
a pawl spring that biases the pawl toward the first pivot position; and
an actuator assembly having a cam follower, a cam, a first actuator device, a second actuator device, and a cam coupling, the cam follower being coupled to the pawl for movement therewith about the pivot axis, the cam being movable along a movement axis that is parallel to the pivot axis, the cam contacting the cam follower and including a first cam portion, and a second cam portion, wherein positioning of the first cam portion on the cam follower positions the pawl in the first pivot position, and wherein positioning of the second cam portion on the cam follower positions the pawl in the second pivot position, the first actuator device comprising a first linear motor with a first output member that is movable along the movement axis between a first output member position and a second output member position, the first output member being coaxial with the cam, the second actuator device comprising a second linear motor with a second output member, the second output member being movable along the movement axis between a third output member position and a fourth output member position, the second output member being coaxial with the first output member, the cam coupling comprising a first biasing spring and a locking mechanism, the first biasing spring being configured to bias the cam in a first direction along the movement axis relative to the first output member, the locking mechanism being configured to selectively lock the cam to the first output member for axial movement therewith, the locking mechanism being configured to unlock the cam from the first output member in response to movement of the second output member from the third output member position to the fourth output member position when the first output member is in the first output member position, the locking mechanism being configured to lock the cam to the first output member in response to movement of the second output member from the fourth output member position to the third output member position when the first output member is in the first output member position.

2. The park lock mechanism of claim 1, wherein the second output member moves the cam in a second direction along the movement axis when the second output member is moved from the fourth output member position to the third output member position and the first output member is in the first output member position, the second direction being opposite the first direction.

3. The park lock mechanism of claim 2, wherein the locking mechanism comprises a plunger and a ball, the plunger being coupled to the second output member for axial movement therewith, the plunger defining an engagement profile on which the ball is disposed.

4. The park lock mechanism of claim 3, wherein the ball is received in a hole in the first output member and is configured to engage a recess in the cam to lock the cam to the first output member.

5. The park lock mechanism of claim 4, wherein the plunger includes a ramped portion that is configured to urge the ball through the hole and into the recess in the cam and wherein the locking mechanism further comprises a second biasing spring that is disposed between the plunger and the first output member, the second biasing spring biasing the ramped portion of the plunger toward the ball.

6. The park lock mechanism of claim 3, wherein the plunger is received in the first output member.

7. The park lock mechanism of claim 6, wherein the second output member and the plunger are moveable along the movement axis relative to the first output member through a predetermined range of motion.

8. The park lock mechanism of claim 1, wherein the first biasing spring is coaxial with the first output member.

9. The park lock mechanism of claim 1, wherein the second linear motor comprises an electromagnetic coil.

10. The park lock mechanism of claim 1, wherein the first linear motor comprises a rotary motor and a lead screw that is driven by the rotary motor.

11. A park lock mechanism for a vehicle driveline component having a rotatable member, the park lock mechanism comprising:
a housing;
a dog ring that is adapted to be coupled to the rotatable member for common rotation, the dog ring being received in the housing and comprising a plurality of circumferentially spaced apart teeth;
a pawl having a pawl tooth, the pawl being pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing;
a pawl spring that biases the pawl toward the first pivot position; and
an actuator assembly having a first linear actuator, a locking mechanism, a first biasing spring, and a second linear actuator, the first linear actuator having a first output member that is movable along a movement axis that is parallel to the pivot axis, the locking mechanism being configured to selectively couple the first output member and the cam for common movement along the movement axis, the first biasing spring being configured to move the cam along the movement axis relative to the first output member when the locking mechanism decouples the cam from the first output member, the second linear actuator being configured to operate the locking mechanism to decouple the cam from the first output member to permit the first biasing spring to move the cam along the movement axis.

12. The park lock mechanism of claim 11, wherein the second linear actuator is further operable to move the cam against the first biasing spring to re-set the locking mechanism such that the locking mechanism locks the cam to the first output member for common axial movement along the movement axis.

13. The park lock mechanism of claim 11, wherein the locking mechanism comprises a plunger and a ball, the plunger being coupled to a second output member of the second linear actuator for axial movement therewith, the plunger defining an engagement profile on which the ball is disposed.

14. The park lock mechanism of claim 13, wherein the ball is received in a hole in the first output member and is configured to engage a recess in the cam to lock the cam to the first output member.

15. The park lock mechanism of claim 14, wherein the plunger includes a ramped portion that is configured to urge the ball through the hole and into the recess in the cam and wherein the locking mechanism further comprises a second biasing spring that is disposed between the plunger and the first output member, the second biasing spring biasing the ramped portion of the plunger toward the ball.

16. The park lock mechanism of claim 13, wherein the plunger is received in the first output member.

17. The park lock mechanism of claim 16, wherein the second linear actuator has a second output member and wherein the plunger and the second output member are moveable along the movement axis relative to the first output member through a predetermined range of motion.

18. The park lock mechanism of claim 11, wherein the first biasing spring is coaxial with the first output member.

19. A method for operating a park lock mechanism having a dog ring, a pawl, a cam follower and a cam, the dog ring being rotatable about an drive axis and having a plurality of circumferentially spaced apart teeth, the pawl having a pawl tooth that is pivotable about a pivot axis between a first pivot position, in which the pawl tooth is disengaged from the teeth of the dog ring, and a second pivot position in which the pawl tooth engages the teeth of the dog ring, the cam follower being mounted to the pawl for common movement about the pivot axis, the cam being movable along a movement axis and having first and second cam portions, wherein positioning of the first cam portion on the cam follower positions the pawl in the first pivot position, wherein positioning of the second cam portion on the cam follower positions the pawl in the second pivot position, the method comprising:

provirding a first actuator and a second actuator, the first actuator having a first output member, the second actuator having a second output member that is coaxial with the first output member;

locking the cam to the first output member;

operating the first actuator to move the cam along the movement axis and cause pivoting motion of the pawl between the first and second pivot positions;

operating the second actuator to decouple the cam from the first output member; and moving the cam along the movement axis to cause pivoting motion of the pawl from the first pivot position to the second pivot position in response to decoupling the cam from the first output member.

20. The method of claim 19, further comprising operating the second actuator to move the cam along the movement axis to cause pivoting motion of the pawl into the first pivot position and re-coupling of the cam to the first output member.

21. The method of claim 19, further comprising operating the first actuator to move the first output member along the movement axis and couple the first output member to the cam.

* * * * *